(12) United States Patent
Reyes et al.

(10) Patent No.: US 8,345,079 B2
(45) Date of Patent: Jan. 1, 2013

(54) CAMERA SERVICE PORT AND REMOTE CAMERA SYSTEM

(75) Inventors: Jeffrey Delos Reyes, Harbor City, CA (US); Ping-Huang Tsai, Temple City, CA (US)

(73) Assignee: Tatung Company of America, Inc., Long Beach, CA (US)

( * ) Notice: Subject to any disclaimer, the term of this patent is extended or adjusted under 35 U.S.C. 154(b) by 1171 days.

(21) Appl. No.: 12/193,671

(22) Filed: Aug. 18, 2008

(65) Prior Publication Data

US 2010/0039492 A1 Feb. 18, 2010

(51) Int. Cl.
*H04M 11/00* (2006.01)
(52) U.S. Cl. ..................................... 348/14.01; 370/352
(58) Field of Classification Search .... 348/14.01–14.09, 348/207, 143, 164; 352/86, 166, 87; 455/557; 370/338, 352
See application file for complete search history.

(56) References Cited

U.S. PATENT DOCUMENTS

| | | | | |
|---|---|---|---|---|
| 7,057,642 B2 * | 6/2006 | Mogamiya et al. | ...... | 348/207.99 |
| 8,050,192 B2 * | 11/2011 | Park | .............. | 370/254 |
| 2001/0055072 A1 * | 12/2001 | Mogamiya et al. | ........... | 348/335 |
| 2003/0109280 A1 * | 6/2003 | Bodnar et al. | ................ | 455/556 |
| 2003/0156030 A1 * | 8/2003 | Lee et al. | ....................... | 340/541 |
| 2007/0288974 A1 * | 12/2007 | Creamer et al. | .............. | 725/105 |
| 2011/0197241 A1 * | 8/2011 | Creamer et al. | .............. | 725/105 |

* cited by examiner

*Primary Examiner* — Curtis Kuntz
*Assistant Examiner* — Maria El-Zoobi

(57) ABSTRACT

A camera service port has an automatic termination for connecting to a near-side monitor. The camera service includes an audio jack and a phone jack. The audio jack includes first and second terminals for receiving signals from a camera and connecting to the near-side monitor. The phone jack includes a first connector coupled to the camera, an equivalent resistor coupled to the first connector, and a second connector coupled to the camera. The second connector is flexible to connect to the first terminal without being connected to an equivalent resistor. When the audio jack is plugged into the phone jack, the first terminal is coupled to the second connector and the second terminal is coupled to the first connector for receiving the signal from the camera. When the audio jack is not plugged into the phone jack, the equivalent resistor is coupled between the second connector and the first connector.

13 Claims, 5 Drawing Sheets

CAMERA SERVICE PORT AND REMOTE CAMERA SYSTEM

BACKGROUND OF THE INVENTION

1. Field of the Invention

The invention relates to a camera service port, and in particular relates to a camera service port using an audio jack and phone jack to transmit signals for automatic termination.

2. Description of the Related Art

FIG. 1 shows a conventional remote camera system 100. The remote camera system 100 comprises a camera 1 and a remote monitor 2. The camera 1 is used for motion picture acquisition and electrical signal transformation. The electrical signals are transmitted through a long cable or wire to the remote monitor 2 to display video images.

BRIEF SUMMARY OF THE INVENTION

A detailed description is given in the following embodiments with reference to the accompanying drawings.

An embodiment of a camera service port is provided. The camera service port has an automatic termination function for connecting to a near-side monitor. The camera service comprises an audio jack and a phone jack. The audio jack comprises a first terminal and a second terminal for receiving signals from a camera and connecting to the near-side monitor. The phone jack comprises a first connector coupled to the camera, an equivalent resistor coupled to the first connector, and a second connector coupled to the camera. The second connector is flexible to connect to the first terminal without being connected to an equivalent resistor. When the audio jack plugs into the phone jack, the first terminal is coupled to the second connector and the second terminal is coupled to the first connector for receiving the signal from the camera. When the audio jack does not plug into the phone jack, the equivalent resistor is coupled between the second connector and the first connector.

Another embodiment of a remote camera system is provided. The remote camera system comprises a camera, a remote monitor, an audio jack and a phone jack. The camera is used for motion picture acquisition and electrical signal transformation. The remote monitor receives the signals from the camera to display the motion pictures. The audio jack comprises a first terminal and a second terminal for receiving the signals from the camera and connecting to a near-side monitor. The phone jack comprises a first connector coupled to the camera, an equivalent resistor coupled to the first connector, and a second connector coupled to the camera. The second connector is flexible to connect to the first terminal without being connected to an equivalent resistor.

When the audio jack plugs into the phone jack, the first terminal is coupled to the second connector and the second terminal is coupled to the first connector for receiving the signal from the camera. When the audio jack does not plug into the phone jack, the equivalent resistor is coupled between the second connector and the first connector.

Another embodiment of a remote camera system is provided. The remote camera system comprises a camera, a remote monitor, a near-side monitor and a camera service port. The camera is used for motion picture acquisition and electrical signal transformation. The remote monitor receives the signals from the camera to display the motion pictures. The near-side monitor is used for checking the operation of the camera. The camera service port is coupled between the camera and the near-side monitor and transmits the signals from the camera to the near-side monitor. The camera service port comprises a switch, which connects the camera to the near-side monitor or to an equivalent resistor.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
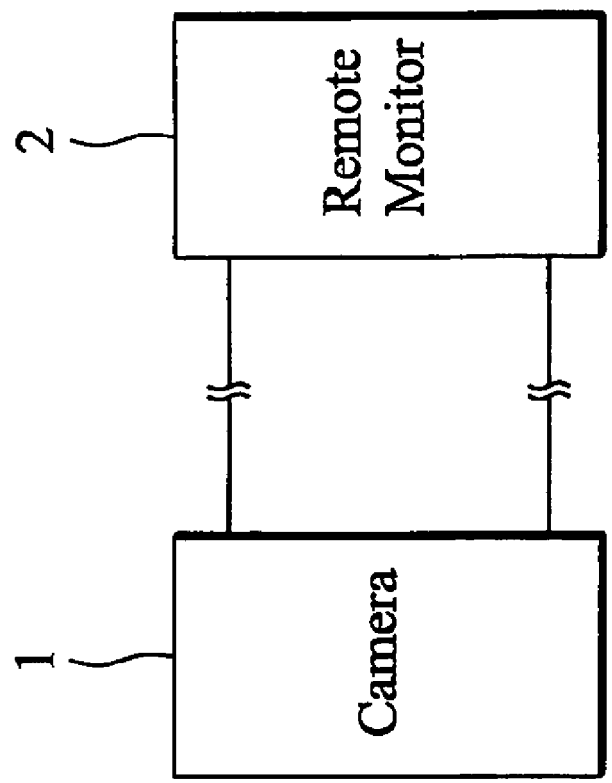
FIG. 1 shows a conventional remote camera system.
Figure 2:
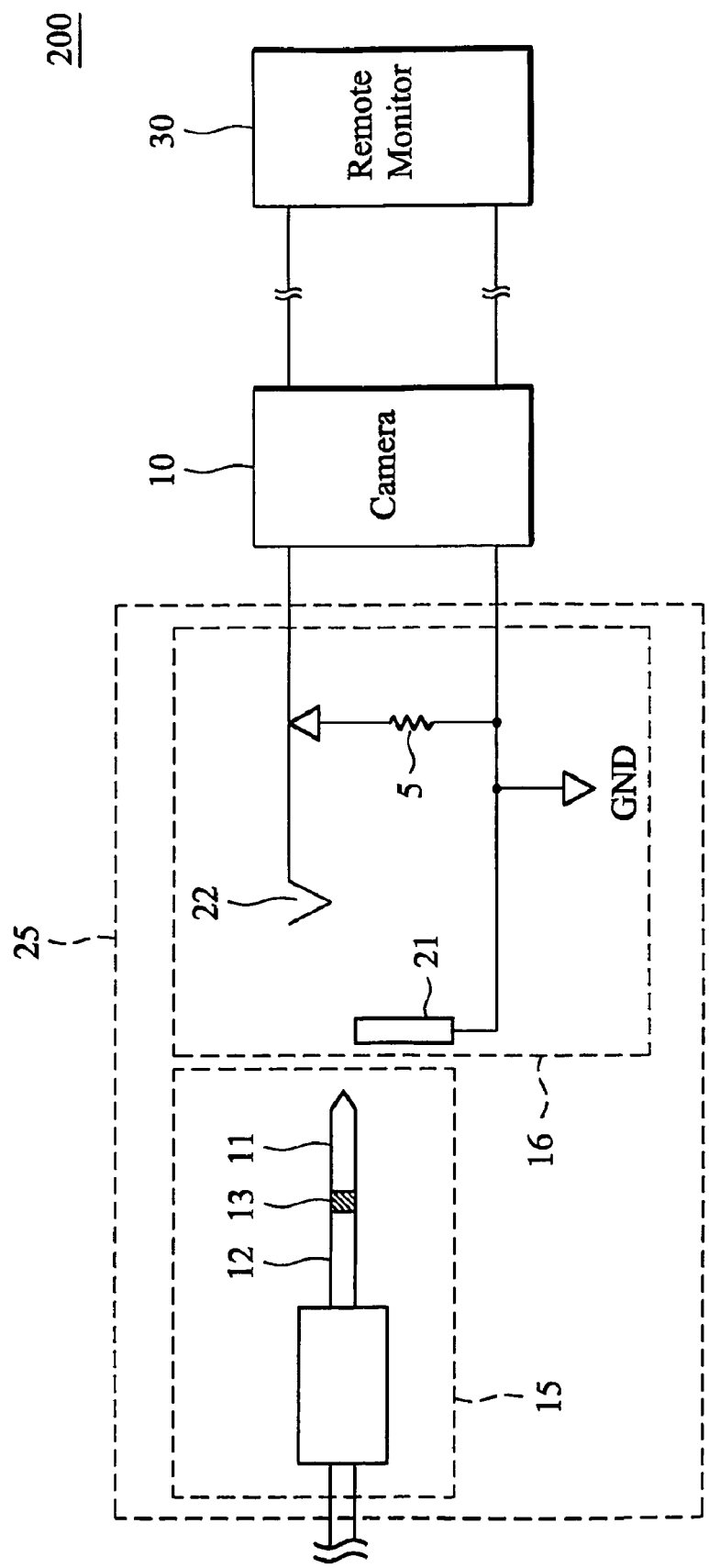
FIG. 2 shows a remote camera system which is not connected to the near-side monitor according to an embodiment of the invention.

FIG. 2 shows a remote camera system 200 which is not connected to the near-side monitor (not shown in FIG. 2) according to an embodiment of the invention. The remote system 200 comprises a camera 10, a remote monitor 30 and a camera service port 25. The camera 10 is used for motion picture acquisition and electrical signal transformation. The remote monitor 30 receives the signals from the camera 10 to display the motion pictures. The camera service port 25 comprises an audio jack 15 and a phone jack 16. The audio jack 15 comprises a first terminal 11 and a second terminal 12 for receiving the signals from the camera 10 and connecting to the near-side monitor (handheld monitor) (not shown in FIG. 2). The first terminal 11 is a positive terminal and the second terminal 12 is a ground terminal. The phone jack 16 comprises a first connector 21, a second connector 22 and an equivalent resistor 5. The first connector 21 is coupled to the camera and a ground voltage GND. The second connector 22 is coupled to the camera 10. The equivalent resistor 5 is coupled to the first connector 21.

Note that the second connector 22 is flexible and may be connected to the first terminal 11 without being connected to an equivalent resistor 5. When the audio jack 15 does not plug into the phone jack 16, the equivalent resistor 5 is coupled between the second connector 22 and the first connector 21. In addition, the near-side monitor and the equivalent resistor 5 have the same resistance value, such as 75 ohm.

Figure 3:
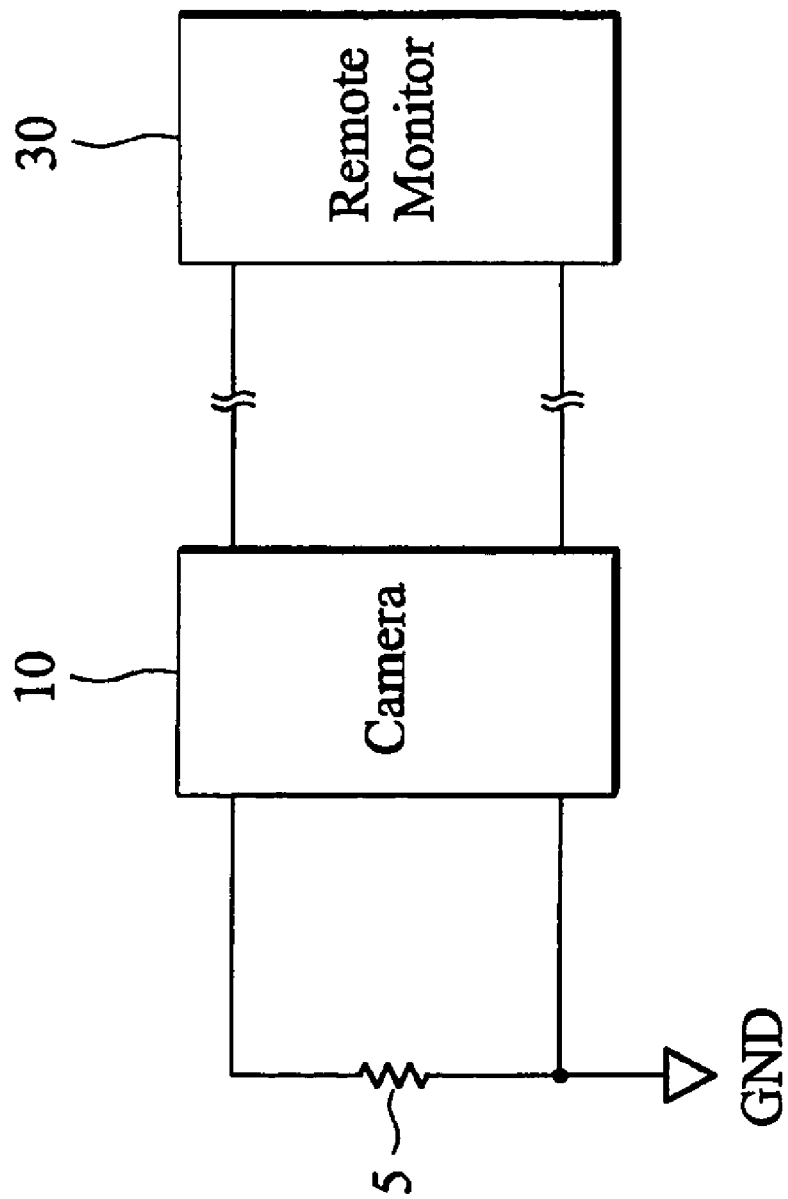
FIG. 3 shows a simplified schematic diagram of the remote camera system which is not connected to the near-side monitor according to an embodiment of the invention.

FIG. 3 shows a simplified schematic diagram of the remote camera system 200 which is not connected to the near-side monitor according to an embodiment of the invention. The camera 10 only transmits the signal to the remote monitor 30 and is coupled to the equivalent resistor 5.

Figure 4:
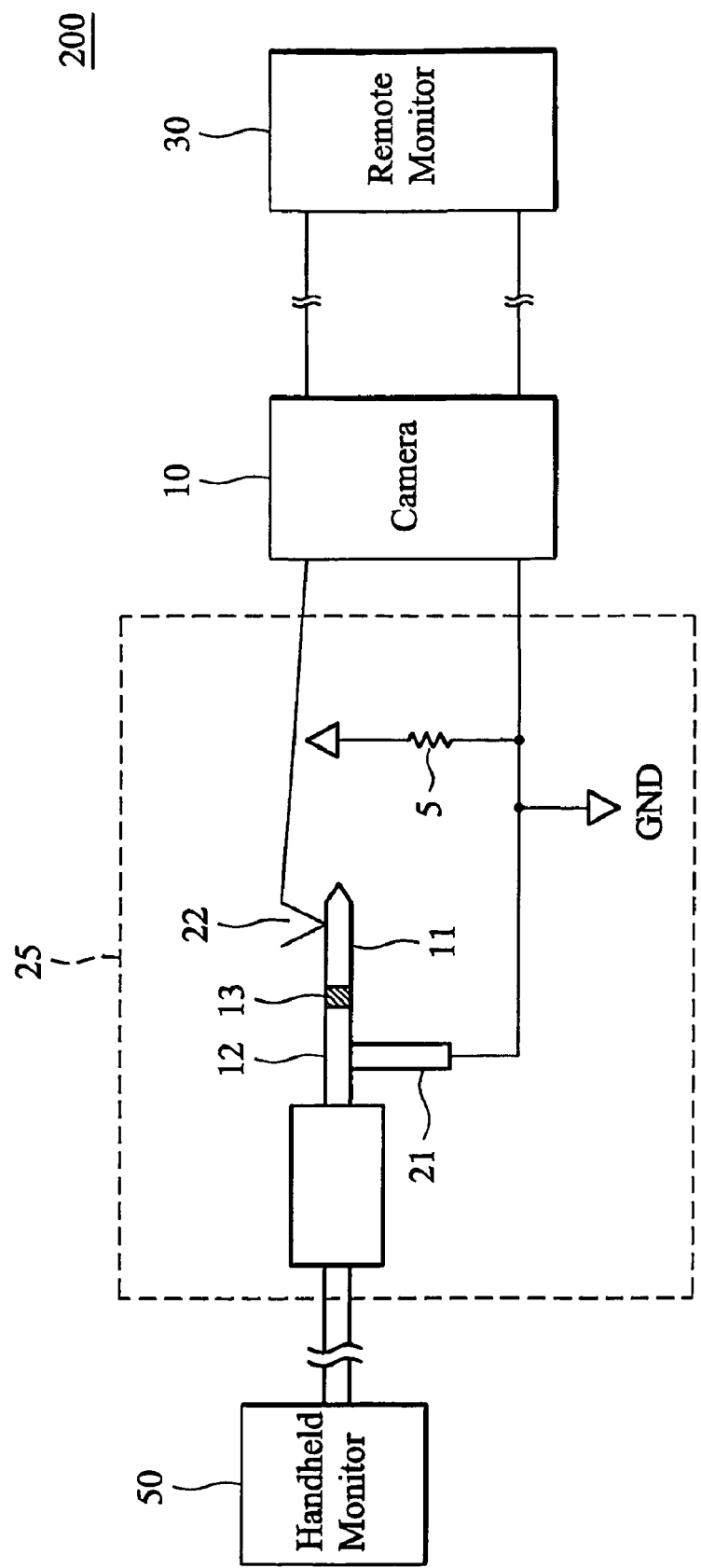
FIG. 4 shows the remote camera system which is connected to the near-side monitor and the remote monitor according to another embodiment of the invention.

FIG. 4 shows the remote camera system 200 which is connected to the near-side monitor 50 and the remote monitor 30 according to another embodiment of the invention. When the audio jack 15 plugs into the phone jack 16, the first terminal 11 is coupled to the second connector 22 and the second terminal 12 is coupled to the first connector 21. The near-side monitor can receive the signals from the camera 10 to check the operation of the camera 10. The camera 10 can transmit the signals to the remote monitor 30 and the near-side monitor 50 simultaneously when the audio jack 15 plugs into the phone jack 25. The audio jack 15 and the phone jack 25 receive/transmit signals as video signals for displaying motion pictures on the near-side monitor 50.

Figure 5:
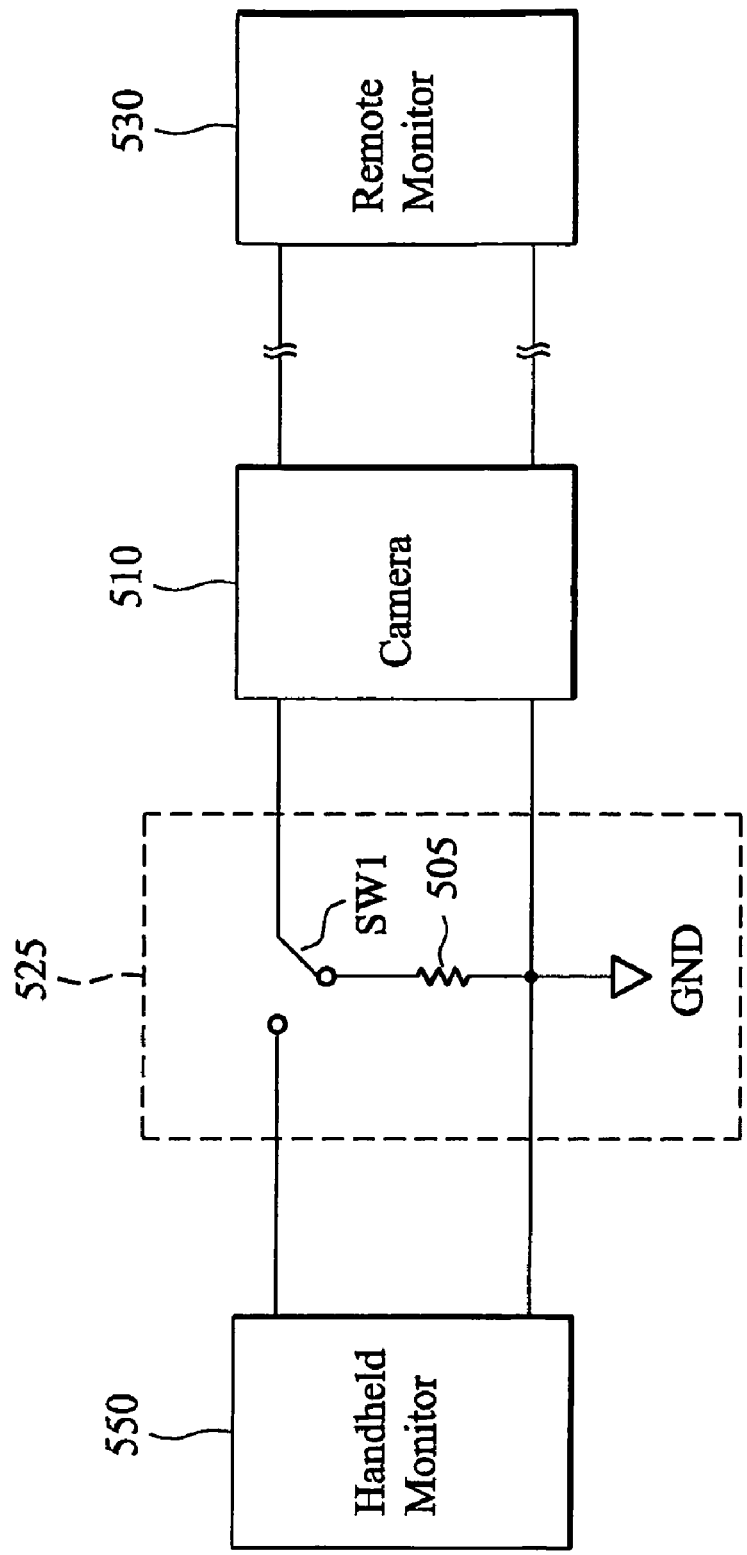
FIG. 5 shows another remote camera system which is connected to the near-side monitor and the remote monitor according to another embodiment of the invention.

FIG. 5 shows another remote camera system 500 which is connected to the near-side monitor 550 and the remote monitor 530 according to another embodiment of the invention. The remote camera system 500 comprises a camera 510, a remote monitor 530, a handheld monitor 550 (near-side monitor) and a camera service 525. The camera 510 is used for motion picture acquisition and electrical signal transformation. The remote monitor 530 receives the signals from the camera 510 to display the motion pictures. The near-side monitor 550 can be used to check the operation of the camera 510 by users. The camera service port 525 is coupled between the camera 510 and the near-side monitor 550 and transmits the signals from the camera 510 to the near-side monitor 550. The camera service port 525 comprises a switch SW1 to connect the camera 510 to the near-side monitor 550 or to connect the camera 510 to an equivalent resistor 505, as shown n FIG. 5. In addition, the near-side monitor 550 and the equivalent resistor 505 have the same resistance value.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera service port with an automatic termination function for connecting to a near-side monitor, comprising
an audio jack comprising a first terminal and a second terminal for receiving signals from a camera and connecting to the near-side monitor; and
a phone jack for transmitting the signals, comprising:
a first connector coupled to the camera;
an equivalent resistor coupled to the first connector; and
a second connector coupled to the camera, wherein the second connector is flexible to connect to the first terminal without being connected to an equivalent resistor,
wherein when the audio jack plugs into the phone jack, the first terminal is coupled to the second connector and the second terminal is coupled to the first connector for receiving the signal from the camera, and when the audio jack does not plug into the phone jack, the equivalent resistor is coupled between the second connector and the first connector.

2. The camera service port as claimed in claim 1, wherein the camera also transmits the signals to a remote monitor.

3. The camera service port as claimed in claim 1, wherein the near-side monitor and the equivalent resistor have the same resistance value.

4. The camera service port as claimed in claim 1, wherein the camera transmits the signals to the remote monitor and the near-side monitor simultaneously when the audio jack plugs into the phone jack.

5. The camera service port as claimed in claim 1, wherein the audio jack and the phone jack receive/transmit the signals as video signals for displaying motion pictures on the near-side monitor.

6. A remote camera system, comprising:
a camera used for motion picture acquisition and electrical signal transformation;
a remote monitor receiving the signals from the camera to display the motion pictures;
an audio jack comprising a first terminal and a second terminal for receiving the signals from the camera and connecting to a near-side monitor; and
a phone jack for transmitting the signals, comprising:
a first connector coupled to the camera;
an equivalent resistor coupled to the first connector; and
a second connector coupled to the camera, wherein the second connector is flexible to connect to the first terminal without being connected to an equivalent resistor,
wherein when the audio jack plugs into the phone jack, the first terminal is coupled to the second connector and the second terminal is coupled to the first connector for receiving the signals from the camera, and when the audio jack does not plug into the phone jack, the equivalent resistor is coupled between the second connector and the first connector.

7. The remote camera system as claimed in claim 6, wherein the near-side monitor and the equivalent resistor have the same resistance value.

8. The remote camera system as claimed in claim 6, wherein the camera transmits the signals to the remote monitor and the near-side monitor simultaneously when the audio jack plugs into the phone jack.

9. The remote camera system as claimed in claim 6, wherein the audio jack and the phone jack receive/transmit the signals as video signals for displaying motion pictures on the near-side monitor.

10. A remote camera system, comprising:
a camera used for motion picture acquisition and electrical signal transformation;
a remote monitor receiving the signals from the camera to display the motion pictures;
a near-side monitor for checking the operation of the camera; and
a camera service port coupled between the camera and the near-side monitor and transmitting the signals from the camera to the near-side monitor, comprising:
a switch, which connects the camera to the near-side monitor or to an equivalent resistor
an audio jack comprising a first terminal and a second terminal for receiving the signals from the camera and connecting to the near-side monitor; and
a phone jack for transmitting the signals, comprising: a first connector coupled to the camera; the equivalent resistor coupled to the first connector; and a second connector coupled to the camera, wherein the second
connector is flexible to connect to the first terminal without being connected to an equivalent resistor,
wherein when the audio jack plugs into the phone jack, the first terminal is coupled to the second connector and the second terminal is coupled to the first connector for receiving the signals from the camera, and when the audio jack does not plug into the phone jack, the equivalent resistor is coupled between the second connector and the first connector.

11. The remote camera system as claimed in claim 10, wherein the near-side monitor and the equivalent resistor have the same resistance value.

12. The remote camera system as claimed in claim 10, wherein the camera transmits the signals to the remote monitor and the near-side monitor simultaneously when the audio jack plugs into the phone jack.

13. The remote camera system as claimed in claim 10, wherein the audio jack and the phone jack receive/transmit the signals as video signals for displaying motion pictures on the near-side monitor.

* * * * *